March 14, 1961  F. SINGER  2,974,575
GEAR ESCAPEMENT FOR A PHOTOGRAPHIC SHUTTER
Filed Nov. 19, 1959

United States Patent Office 2,974,575
Patented Mar. 14, 1961

2,974,575

GEAR ESCAPEMENT FOR A PHOTOGRAPHIC SHUTTER

Franz Singer, Munich, Germany, assignor to Compur-Werk Friedrich Deckel OHG, Munich, Germany, a German firm Filed Nov. 19, 1959, Ser. No. 854,086

Claims priority, application Germany Nov. 25, 1958

5 Claims. (Cl. 95—63)

The present invention relates to a gear escapement for a photographic objective shutter. More particularly, the gear escapement is of the type which retards a main drive member or master member during the running down of the shutter after the shutter blades are opened from an initial closed position, the retarding effect of the gear escapement being adjustable according to the shutter speed selected before releasing the master member to perform its cycle of opening and closing the shutter blades during the running down movement of the shutter.

An object of the invention is to provide a generally improved and more satisfactory shutter for a photographic camera having improved accuracy in the shortest shutter speed settings.

Another object is the provision of a new and improved gear escapement for retarding the running down of the master member of a mechanically controlled shutter, the retarding effect of the gear escapement being adjustable in a conventional manner for the setting of the usual range of shutter speeds while yet having improved performance in the shorter shutter speed settings.

Still another object is to provide a new and improved gear or wheel escapement of the foregoing type having a variable retarding action, so that a small retarding action is provided for the shorter shutter speed settings while a strong retarding action is exerted for the other longer shutter speeds.

A further object is the provision of a new and improved gear escapement arranged to retard a master member during its running down movement in such a manner as to lessen the wear of the engaging parts, thereby preserving the efficiency and accuracy of timing of the shutter even after long usage.

Figure 2:
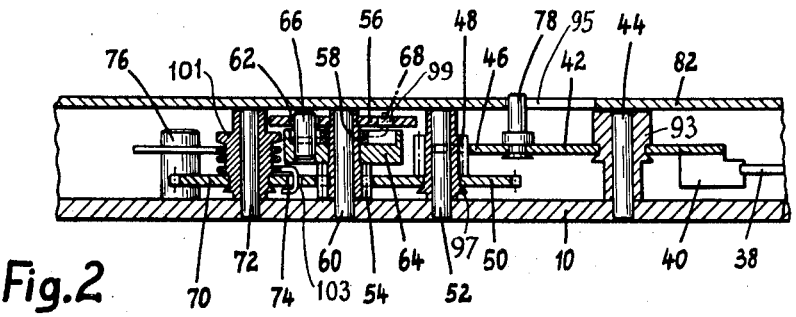
Figure 1:
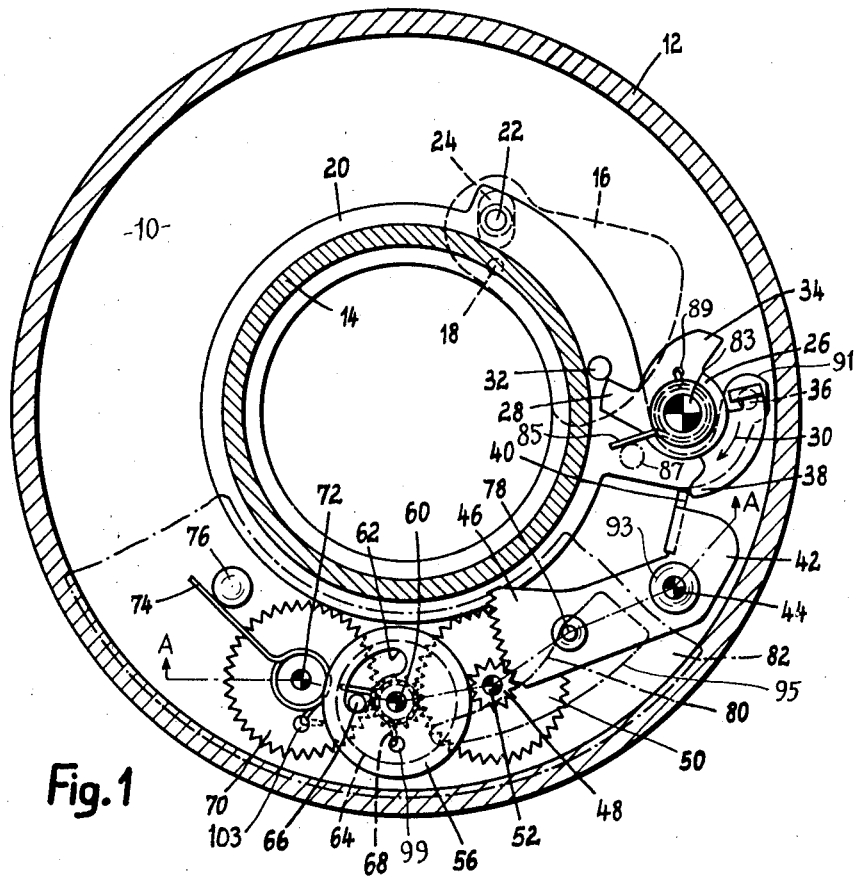

These and other desirable objects may be attained in the manner disclosed as an illustrative embodiment of the invention in the following description and in the accompanying drawings forming a part hereof, in which:

Fig. 1 is a transverse diametrical cross section through an objective shutter, parts not essential to the understanding of the invention having been omitted; and Fig. 2 is a section taken approximately along the line A—A of Fig. 1 in an axial direction.

The same reference numerals throughout the several views indicate the same parts.

The gear escapement of the present invention for the timing of shutter speeds is applied to a suitable objective shutter of the mechanically controlled type such as, for instance, the shutter disclosed in Patent No. 2,785,612 to F. Singer, granted March 19, 1957, or the shutter disclosed in Patent No. 2,888,866 to K. Gebele, granted June 2, 1959. Only so much of the shutter as is essential to an understanding of the present invention will be described, it being understood that the remaining mechanism may be of conventional construction.

In Fig. 1 is illustrated an objective shutter housing having a rear supporting plate or bottom wall 10, an outer cylindrical shutter wall 12, and an inner concentric forwardly extending lens tube 14 enclosing a central lens aperture having an optical axis. A plurality of circumferentially spaced and overlapping shutter blades 16 of conventional form are provided, only one blade 16 being here shown, and are mounted in the usual manner for opening movement out of the lens aperture to the position illustrated, and for closing movement back into the lens aperture after an interval determined by the shutter speed set on the camera. Each shutter blade 16 has the usual two pivots 18 and 22, one pivot 18 being a fulcrum pivot mounted in the shutter casing and the other pivot 22 constituting an operative connection between the blade and a blade ring 20 which is mounted to turn first in one direction to open all of the shutter blades and then in a reverse direction to close them. The blade ring 20 may be mounted to turn on the lens tube 14 as a bearing, about an axis which coincides with the optical axis of the lens system. The movable pins 22 carried by the rotatable blade ring 20 engage in slots 24 of the blades 16 to effect the pivoting of the blades about the fixed fulcrums 18.

The backward and forward movement of the blade ring 20 is produced by a rotatable main drive member or master member 26. The master member 26 is rotatable about a pin 83 fixed in the shutter housing, and is acted upon by a drive spring 85 tending to turn the master member in a clockwise direction. The drive spring 85 is coiled about the pin 83 and has one end reacting against a stationary stud 87 supported on the shutter housing, while the other end is secured to the master member 26 as by being bent over through an aperture 89 therein. The master member 26 is set or tensioned by being rotated in a counterclockwise direction as, for instance, by a cocking ring not here shown but corresponding, for example, to the cocking ring 22 provided in the aforementioned Gebele patent or to the tensioning ring 30 provided in the aforementioned Singer patent. The tensioned master member is latched, and upon releasing the latch to make an exposure, the master member 26 runs down in the direction of the arrow 30 to effect the opening and closing of the shutter blades 16 in a manner to be described. The latch for the master member may correspond, for instance, to the locking lever 32 disclosed in the said Gebele construction, or the latching pawl 42 described in the said Singer construction.

To effect the opening of the shutter blades 16, the master member 26 has a projection 28 which is engageable with a pin 32 carried by the blade ring 20. By this engagement, the blade ring 20 is rotated in a counterclockwise direction to swing the shutter blades 16 out of the lens aperture. To effect the closing of the shutter blades 16, the blade ring 20 has an arm 91 which extends radially outwardly for a distance to a position near the outer wall 12 of the shutter housing, and then extends a short distance circumferentially, and carries at the end of its circumferential portion a fixed pin 36. Upon the further running down of the master member 26, the pin 36 is struck by another projection 34 on the master member 26 which is circumferentially spaced from the projection 28 in a clockwise direction. Engagement of this other projection 34 with the pin 36 rotates the blade ring 20 back in a clockwise direction, whereby the blades 16 are swung back into the lens aperture and the aperture is thus closed.

Between the opening and closing of the blades 16, the running down of the master member 26 is retarded by a gear or wheel escapement according to the invention, the retarding action lasting for a period of time corresponding to the shutter speed set on the shutter speed control member. The retardation is occasioned by the engagement of a projection 38 on the master member 26 with a lug 40 of an escapement ratchet or gear sector 42. The escapement ratchet 42 takes the form of a lever fixed on a bushing 93, see Fig. 2, rotatably mounted on a pin 44 supported on the bottom wall 10 of the shutter housing or on a separate mounting plate secured in the housing. The other arm 46 of the ratchet 42 is provided at its end with gear teeth in meshing engagement with a pinion 48 forming the first wheel or gear of a chain of gears in meshing engagement with one another. In the usual manner of a gear escapement mechanism of this general type, the pressure of the master member 26 on the lug 40 provided by the drive spring 85 rotates the ratchet 42 in a counterclockwise direction until the lug 40 is out of the path of the projection 38, whereafter the master member 26 may proceed unimpeded to complete its running down movement. Counterclockwise rotation of the ratchet 42 is retarded by the chain of gears to be described presently, of which the pinion 48 is the first gear.

The amount of the escapement delay is adjustable in order to obtain varying lengths of retardation corresponding to the different shutter speeds. This adjustment is effected by changing the size of the path over which the master member 26 engages the lug 40 at the front end of the escapement mechanism, and is achieved by displacing the point along the running down path of the master member at which it becomes engaged with the escapement. To this end, the usual shutter speed control ring 82 is provided, having a circumferentially extending time cam slot 95. The ring 82 may correspond with the shutter speed control ring 63 disclosed in Patent No. 1,687,123 to F. Deckel et al., issued October 9, 1928. The slot 95 has a cam edge 80 slidably engaged with a pin 78 on the ratchet 42. In the position illustrated, the greatest retardation time is set corresponding to the longest shutter speed, and the lug 40 lies to a considerable extent in the path of the projection 38 on the master member 26. Rotating the shutter speed control ring 82 in a counterclockwise direction engages the pin 78 with successively different portions of the cam 80, thereby rotating the ratchet 42 in a counterclockwise direction to move the lug 40 to a larger and larger extent out of the path of the projection 38. Thus the retardation time is correspondingly reduced.

It can be seen that there may be very slight overlappings between the engaging parts of the master member and the escapement mechanism when a relatively short shutter speed is set. This causes high pressures per unit area, increased wear, and eventually reduced accuracy. The present gear escapement mechanism is designed to overcome these shortcomings.

The restraint or retardation exercised by a gear escapement mechanism is produced in the manner that the masses of the gears are accelerated. Since the present escapement is not an anchor escapement type, this exception may be disregarded. Accordingly, the escapement may be effected (a) by varying the acceleration of the gears which appears structurally as the transmission ratio between the first and the last gear and (b) by changing the masses of the gears to be accelerated. In view of the aforementioned overlapping between the cooperating parts 38, 40 of the master member 26 and of the escapement mechanism, an escapement with strong retarding action has, for the same escapement times, a short escapement path and thus a slight overlapping, while the escapement path and the overlapping increase with a decrease in the specific retarding action. On the basis of this, the specific retarding action of the escapement mechanism is made variable in accordance with the present invention, so that for long escapement times a larger mass acts, while for short escapement times a smaller mass acts.

Returning to Figs. 1 and 2, the previously mentioned pinion 48 is fixed to a bushing 97 rotatable on a pin 52 supported in fixed position on the bottom wall 10 of the shutter housing. Also fixed to the bushing 97 for rotation with the pinion 48 is another larger gear 50. The gear 50 is in meshing engagement with a pinion 54 fixed to a bushing 58 which is turnably mounted on a pin 60 likewise supported on the bottom of the shutter housing.

In accordance with the invention, a flywheel 56 is also fixed to the bushing 58. The flywheel 56 has a slot 62 which extends in a circumferential direction. A disk or second flywheel 64 is loosely rotatable on the bushing 58 between the pinion 54 and the first flywheel 56. The first flywheel 56 and the disk 64 have a lost motion coupling provided by a pin 66 on the disk 64 engaged in the slot 62. The two flywheels 56 and 64 are further coupled together by a coiled spring 68 wound around the bushing 58 and having one end engaged in an aperture 99 in the flywheel 56, while the other end bears against the pin 66. The coiled spring 68 serves to press the disk 64 against one end of the pinion 54 for rotation thereon, and also serves to urge the pin 66 to a basic or rest position abutting the front end of the slot 62 having reference to the running down direction of the flywheel 56. Since the ratchet 42 runs down in a counterclockwise direction, it follows that the flywheel 56 likewise runs down in a counterclockwise direction. The spring 68 urges the pin 66 in a counterclockwise direction in order to be engaged with the front end of the slot 62 with regard to the direction defined.

The pinion 54 is in meshing engagement with a larger gear 70 fixed to a bushing 101 rotatably mounted on a pin 72 supported on the bottom wall 10 of the shutter housing. The gear 70 is weighted in a counterclockwise direction by a return spring 74. The spring 74 is coiled about the bushing 101 and is engaged in an aperture 103 in the gear 70 at one end, while the other end is extended outwardly and abuts against a pin 76 fixed to the bottom wall 10 of the shutter housing.

In the operation of the present construction, the shutter speed is set by movement of any suitable control member either on the camera or on the shutter unit itself, as a result of which the shutter speed control ring 82 is rotated to a corresponding position. The cam 80 of the ring 82 bears on the pin 78 of the escapement ratchet 42 to position the ratchet 42 according to the particular shutter speed set. After unlatching the tensioned master member 26 in the manner previously indicated, the master member 26 begins to run down in a clockwise direction to first open the shutter blades 16. The projection 28 on the master member strikes the pin 32 to rotate the blade ring 20 in a counterclockwise direction and move the blades 16 out from the lens aperture to an open position.

Thereafter the projection 38 of the master member 26 strikes the lug 40 at the front end of the gear escapement mechanism to start the running down of the gear escapement. The ratchet 42 is thus rotated in a counterclockwise direction. The first flywheel 56 is also accelerated in a counterclockwise direction, the second flywheel or disk 64 being at first not carried along because of its inertia. The front end of the driving slot 62 accordingly moves away from the pin 66, and the weak spring 68 is tensioned without being able to impart any substantial speed to the disk 64. Only after the rear end of the driving slot 62 strikes the pin 66 is the disk 64 also carried along by the first flywheel 56, whereby the mass to be accelerated is increased so that the specific retarding action of the escapement is increased. During the running down of the escapement, the return spring 74 is tensioned. Due to its action on the last gear or wheel 70 of the escapement, the return spring 74 serves at the same time as a backlash spring, without substantially effecting the retarding action.

By adjusting the shutter speed control ring 82, the escapement time is varied by the rotation of the ratchet 42 to a greater or lesser extent about its pivot pin 44 by the engagement of the cam 80 on the pin 78. In the position illustrated, the greatest retardation time is set, and the escapement ratchet 42 after the engagement of the projection 38 of the master member against its lug 40 must completely pass through its range of motion until the projection 38 slides off of the lug 40 and the master member 26 continues its running down movement. The closing of the shutter blades is produced by the subsequent striking of the projection 34 on the master member against the pin 36 carried by the blade ring 20, this engagement rotating the blade ring 20 in a clockwise direction to consequently pivot the shutter blades 16 back into the lens aperture.

For the setting of shorter shutter speeds, the shutter speed control ring 82 is adjusted in a counterclockwise direction, and the lug 40 on the ratchet 42 is moved to a corresponding extent progressively out of the path of the projection 38. For the shortest shutter speeds, the starting position of the lug 40 by which the running down of the master member 26 is retarded, approaches the point where the projection 38 slides off from the lug 40 so that the retarding time is shortened. In the case that the starting position of the lug 40 lies in the last region of its displacement path, the additional mass provided by the second flywheel 64 no longer enters into the retardation action since the projection 38 has already been released from the lug 40 before the pin 66 is engaged by the back end of the slot 62 in the first flywheel 56. However, there is still a sufficiently large escapement path of the lug 40 corresponding to the small specific initial retarding action, and thus favorable overlapping of the lug 40 and the projection 38 upon the striking of the projection against the lug.

The advantage of the present invention is to avoid the high pressures per unit area, increased wear, and eventually reduced accuracy which occur when there are only very slight overlappings between the cooperating engaging parts of the master member and the escapement mechanism, corresponding to the present parts 38 and 40. By using a gear escapement mechanism as herein disclosed having a variable retarding action, the shortest shutter speeds may be set with accuracy on the camera, and the accuracy is maintained even after long usage. Yet the escapement mechanism has a relatively simple structure and may be manufactured economically.

The invention in its broader aspect embodies a gear escapement comprising a chain of gears or gear sectors including a variable mass which is connected for rotation when the escapement is actuated for running down movement, the variable mass being made up of portions or partial masses which are coupled for rotation together in succession as the running down proceeds. The variable mass preferably takes the form of a flywheel and one additional mass or flywheel coupled by a lost motion connection. However, it is within the invention to have the total mass composed of three or more partial masses or flywheels arranged in a suitable manner to be picked up one after the other as the escapement runs down.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic objective shutter comprising a plurality of shutter blades, means including a rotatable blade ring for pivotally mounting said shutter blades, a rotatable master member for engaging said blade ring to move said shutter blades to an open position and thereafter to return them to a closed position, gear retarding mechanism for delaying the rotation of said master member between the opening and closing of said shutter blades, and means for adjusting the delaying effect of said retarding mechanism, said retarding mechanism including a chain of gears, a flywheel connected for rotation with said chain of gears, and at least one additional mass coupled to said flywheel to be carried along thereby after a short initial movement in a running down direction of said retarding mechanism, said additional mass comprising a disk mounted for rotation coaxially with said flywheel, a circumferentially extending lost motion pin and slot connection between said disk and flywheel, and spring means for urging said disk to a rest position with respect to said flywheel.

2. A construction as defined in claim 1, wherein said flywheel has said slot and said disk carries said pin, said spring means being engaged with said flywheel and acting on said pin, said rest position being with said pin at the front end of said slot with respect to the running down direction of said retarding mechanism.

3. A photographic objective shutter comprising a plurality of shutter blades, means including a rotatable blade ring for pivotally mounting said shutter blades, a rotatable master member for engaging said blade ring to move said shutter blades to an open position and thereafter to return them to a closed position, gear retarding mechanism for delaying the rotation of said master member between the opening and closing of said shutter blades, and means for adjusting the delaying effect of said retarding mechanism, said retarding mechanism including a chain of gears, a flywheel connected for rotation with said chain of gears, and at least one additional mass coupled to said flywheel to be carried along thereby after a short initial movement in a running down direction of said retarding mechanism, and retarding mechanism return means having a spring acting on the last gear of said chain of gears, said spring being tensioned during the running down movement of said retarding mechanism.

4. A photographic objective shutter comprising a plurality of shutter blades, means including a rotatable blade ring for pivotally mounting said shutter blades, a rotatable master member for engaging said blade ring to move said shutter blades to an open position and thereafter to return them to a closed position, gear retarding mechanism for delaying the rotation of said master member between the opening and closing of said shutter blades, and means for adjusting the delaying effect of said retarding mechanism in accordance with a selected shutter speed, said retarding mechanism including a chain of gears, and further including a variable mass connected for rotation with said chain of gears in a running down direction thereof, said variable mass comprising a plurality of partial masses coupled together to pass one after another into driving connection during the running down movement of said escapement.

5. A construction as defined in claim 4, wherein said partial masses are coupled by lost motion connections comprising a slot in one partial mass in which is engaged a pin carried by the next partial mass.

References Cited in the file of this patent

UNITED STATES PATENTS 2,039,517    Black  ---------------- May 5, 1936